INVENTOR.
DONALD A. PERREAULT
BY
Anthony D. Cennamo
ATTORNEY

INVENTOR.
DONALD A. PERREAULT
BY Anthony D. Cennamo
ATTORNEY

INVENTOR.
DONALD A. PERREAULT
BY Anthony D. Cennamo
ATTORNEY

INVENTOR.
DONALD A. PERREAULT
BY Anthony V. Cusumano
ATTORNEY

United States Patent Office 3,454,718
Patented July 8, 1969

3,454,718

FSK TRANSMITTER WITH TRANSMISSION OF THE SAME NUMBER OF CYCLES OF EACH CARRIER FREQUENCY

Donald A. Perreault, Pittsford, N.Y., assignor to Xerox Corporation, Rochester, N.Y., a corporation of New York Filed Oct. 3, 1966, Ser. No. 583,914
Int. Cl. H04l 27/20, 27/12; H04n 5/38
U.S. Cl. 178—66 9 Claims

ABSTRACT OF THE DISCLOSURE

In a frequency shift transmission system, the same number of cycles of each carrier frequency for each data state is transmitted. The binary input data is stored in a buffer store and then read out independent of the data rate. Buffer read out is controlled by clock pulses derived from carrier frequency to be transmitted.

This invention relates to data transmission and, more particularly, to the transmission of digital data by frequency shift keying.

In the transmission of data information, as from a facsimile scanner or the output of a computer, it is often desired to transmit such information over switched telephone networks in order to utilize the extensive coverage of the switched telephone network and the relatively easy access to such networks that is available. In such transmission systems, quick and accurate service, however, as well as low cost operation, is desirable. To achieve low cost but rapid transmission service has, in the past, been difficult as the system required a large bandwidth capability transmission medium in order to maintain picture resolution and/or signal quality at a high level. The main drawback, therefore, to such prior art devices has been the prohibitively high rental or installation costs of the use of the transmission medium used to transmit the large signal densities. It is apparent, therefore, that the high cost of such transmission line service becomes a serious limitation on the economic usefulness of the facsimile or computer transmission equipment. The worldwide telephone network, therefore, provides an attractive means for transmitting graphic information with the attendant relatively low cost, extensive subscriber service, and the fact that no other transmission medium need be installed.

Transmission over the switched telephone network could be accomplished by the technique known as frequency shift keying. Binary data transmission by frequency shift keying is accomplished by assigning a different carrier frequency to each state of the data, i.e., "mark" and "space," and transmitting the appropriate frequency for a period of time sufficient to insure reliable detection.

This is called a "baud" and its reciprocal is called the "baud rate." In binary data transmission, each baud carries one bit of information. Therefore, the baud rate is the same as the bit rate. In frequency shift key systems a limitation on the baud rate is the ratio of baud rate to the lower carrier frequency. In practical systems the ratio is usually one or greater, although systems with a ratio between ½ and 1 are known. In cases where the choice of the lower carrier is restricted by the channel, e.g. a voice frequency channel, this becomes the determining factor for the maximum baud rate which can be realized.

The frequency shift keying technique may be extended to include frequency transmission of data information with more than the normal two-level mark and space frequencies. That is, in a multi-level data transmission system employing frequency shift keying, a plurality of frequencies would be transmitted, one frequency for each level in the data waveform. With the lowest carrier frequency determining the upper limit on the baud rate, information transmission is even more critically hampered in a limited bandwidth transmission system.

It is accordingly, an object of the present invention to increase the efficiency of a data transmission system utilizing frequency shift keying.

It is another object of the present invention to optimize the information handling capability of graphic communication systems utilizing frequency shift keying.

It is another object of the present invention to reduce the operating costs of transmitting binary data information over a limited bandwidth transmission medium.

It is another object of the present invention to increase the baud rate of binary information transmission in frequency shift keyed graphic communication systems.

In accomplishing the above and other desired aspects, applicant has invented novel apparatus for efficiently transmitting graphic information to remote locations utilizing an improved frequency shift keyed transmitting system. Circuit means are provided for transmitting the same number of cycles, at least one, of each carrier frequency for each data state being transmitted. Thus, the baud length will depend upon which data state is being transmitted. The baud will be shorter when the upper carrier is being transmitted than when the lower carrier is being transmitted, thus resulting in a higher average baud rate, except in cases where the data state is associated with the lower frequency predominates. In the ordinary facsimile system, for example, the black or data information (often five to ten percent of an average business document) would be associated with the lower carrier frequency, and the white or background (ninety to ninety-five percent of a document) would be associated with the upper frequency, thus producing a significant increase in document transmission rate. It is required, however, that the variable baud lengths of data be acquired under command of the transmitter, as, for example, from digital storage, from a computer, or from a facsimile scanner whose scanning beam position is under control of the transmitter. Likewise, the data must be delivered under command of the receiver to digital storage, or to a printout device as for a computer, or to a facsimile receiver whose scanning beam position is under control of the receiver.

For a more complete understanding of the invention, as well as other objects and further features thereof, reference may be had to the following detailed description in conjunction with the drawings wherein.

Figure 1:
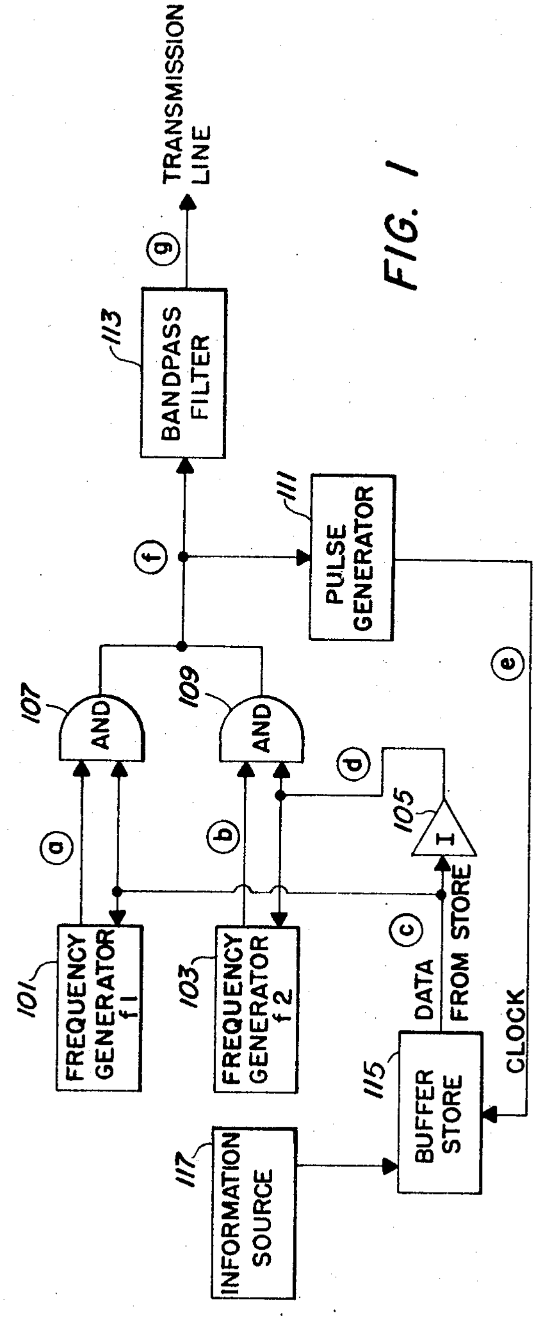
FIGURE 1 is a block diagram of a binary transmitter unit in accordance with one embodiment of the present invention.

Referring now to FIGURE 1, there is shown a block diagram of the binary transmitter according to one aspect of the present invention. Two carriers in a frequency ratio of $f_1/f_2$ are generated by frequency generators 101 and 103. These frequencies are selected for transmission by AND gates 107 and 109 according to whether the input data is "mark" (positive in this case) or "space" (zero in this case). The lower frequency, $f_1$, is assigned to the mark state.

In order to provide that the input data state lasts for exactly one cycle of carrier (regardless of frequency), a pulse is generated from each positive going transition of the combined carrier signal at the output of gates 107 and 109 to "clock" the data out of the information source 117 whether it be a facsimile scanner, electronic computer, or the like. This clock signal is thus at a dual rate according to whether the data being transmitted comprises marks or spaces. This precludes transmission of a serial stream of data arriving under control of an external clock unless intermediate storage is supplied.

In operation, therefore, the data from the primary information source would be stored intermediately at a buffer store 115, of conventional design, in order to provide an immediate, continuous output of information independent of the rate at which the information source 117 generates the binary information. FIGURE 2*c* shows a typical waveform comprising marks and spaces as the output of data from buffer store 115. When a clock pulse from pulse generator 111 occurs, the output from the buffer store 115 will assume either the mark or space level according to the state of the data at the output stage of the buffer store. If the mark level occurs as in FIGURE 2*c*, AND gate 107 is enabled and the lower frequency $f_1$ from frequency generator 101 is transmitted. This is seen in FIGURE 2*a*. As soon as one cycle has occurred, another clock pulse is generated at pulse generator 111. If the data is again "mark" another cycle of $f_1$ is transmitted. If the input data is a space, AND gate 109 is enabled via inverter 105 and the upper frequency $f_2$ from frequency generator 103 is generated, and so on. FIGURE 2*b* shows the time relationship of the space frequency data. The output from inverter 105 is shown at FIGURE 2*d*, which is the data information inverted. FIGURE 2*e* shows the pulses generated at pulse generator 111 between the mark and space data. FIGURE 1 shows the generation and control of the carriers on a square wave basis. Therefore, a bandpass filter 113 is used at the output of the circuit to remove the unwanted high frequencies and thus transmit the carriers as fundamental sine waves. The inputs and outputs of the bandpass filter 113 are seen as FIGURES 2*f* and 2*g*, respectively.

Phase continuity must be preserved at every data transition in order to insure that a clock pulse occurs at the end of each baud and also to avoid distortion of the baud, which would result from transmitting the phase discontinuity through a band limited channel. Phase continuity is guaranteed by using frequency sources designed to start in the same predetermined phase when turned on. This can be accomplished, for example, with clamped sine wave oscillators or with high frequency oscillators divided down to the desired frequency by resettable counter chains.

Figure 2:
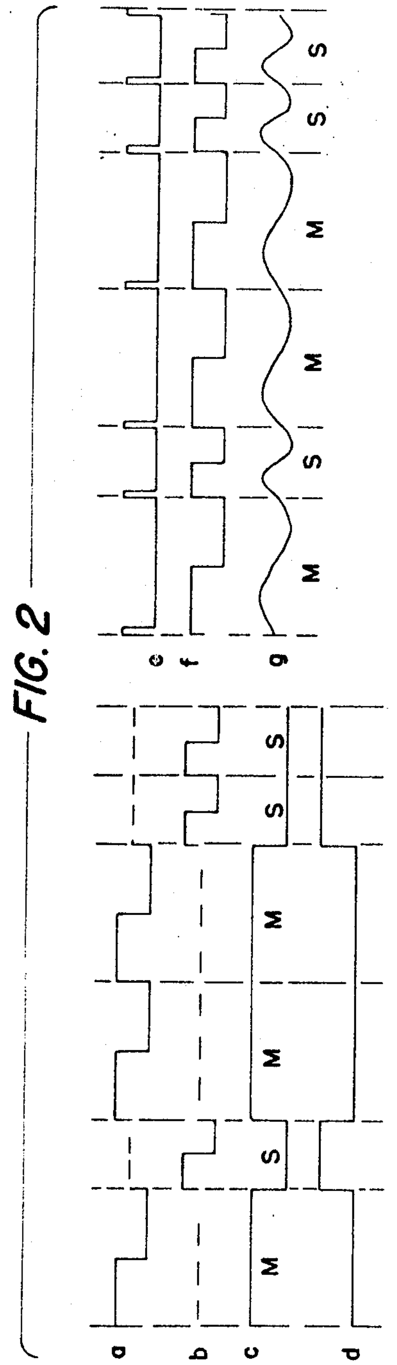
FIGURE 2 shows various waveforms helpful in understanding the invention as shown and described in FIGURE 1.
Figure 3:
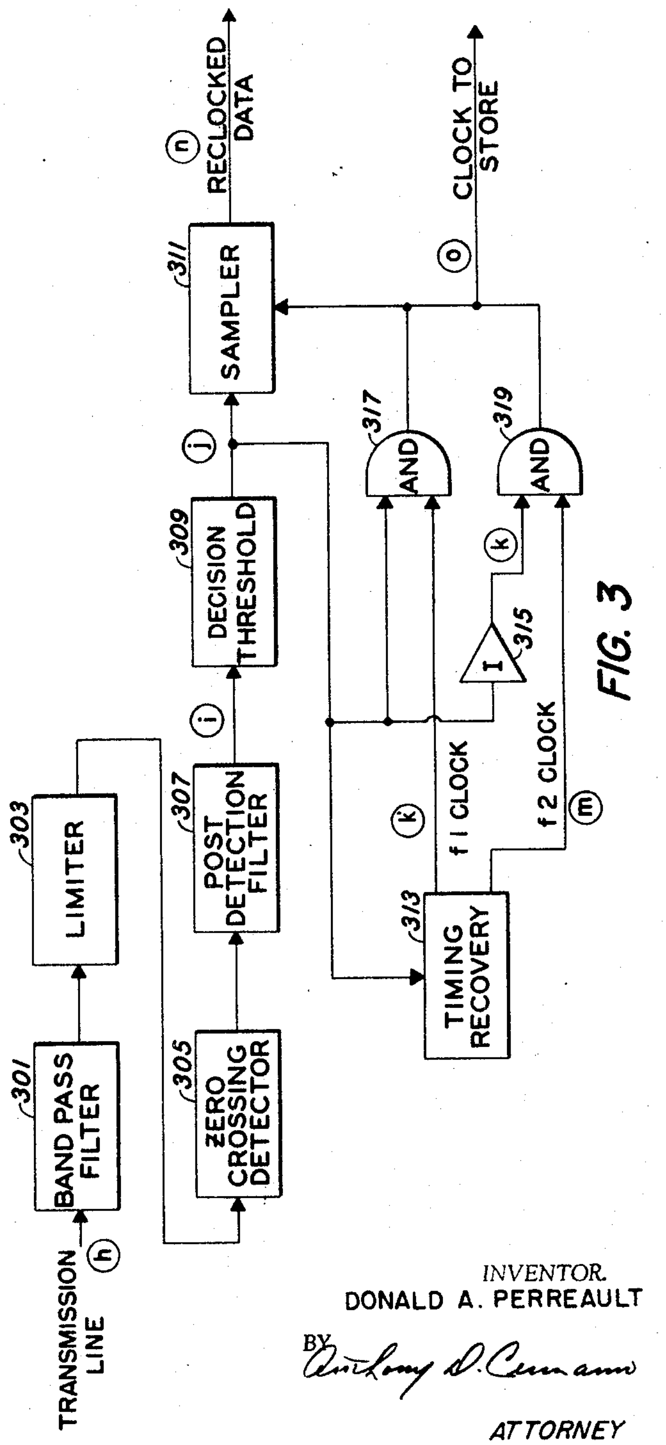
FIGURE 3 is a block diagram of a binary receiver in accordance with the first embodiment of the invention.

A receiver for detecting the "accelerated" frequency shift keyed signal is shown in FIGURE 3. The bandpass filter 301, limiter 303, zero crossing detector 305, post detection filter 307, timing recovery 313, and sampling circuits 311 are all elements of a conventional frequency shift keyed synchronous demodulator. However, the timing recovery requirements are slightly different than in a conventional demodulator. If "raw" facsimile information containing long lengths of data with no transitions is being transmitted, start-stop timing utilizing local stable clocks may be appropriate. Transitions of the transmitted signal could be used directly for timing if the transmission medium is free of frequency shift. If the data rates are integrally related, the higher rate could be recovered by a phase locked loop operating from the recovered data envelope transitions, and divided down to obtain the lower rate. In any case, it is essential that both data rates be available for reclocking the data and that means be provided for selecting the appropriate rate. In FIGURE 2, the data decision threshold is used for this purpose, i.e., when the "marks" are being received, the lower rate is selected for reclocking the data and when "spaces" are being received the higher rate is selected for reclocking the data. The fact that this reclocking technique produces marks of different time duration and spaces of different time duration is immaterial. Only their number is important at this point and the recovered clock guarantees that this information is available. If desired, the reclocking can be arranged so that this variation in time duration does not occur.

The potential improvement in binary transmission speed for a block of data, a facsimile document for example, can be derived as follows. Let the improvement factor, or time compression be defined at the ratio of the normal transmission time, T, to the improved transmission time, $$T' \text{ or } C=\frac{T}{T'}$$

If the normal data rate is based on the lower carrier frequency, as is usually the case, the normal transmission time is $$T=\frac{Nn}{f_1}$$

where

N=total number of bits to be transmitted.
$n$=number of cycles of lower carrier per baud.
$f_1$=lower carrier frequency.

The improved transmission time is given by $$T'=\frac{P_1Nn}{f_1}+\frac{P_2Nn}{f_2}=\left(\frac{P_1}{f_1}+\frac{P_2}{f_2}\right)Nn$$

where, $P_1$=fraction of a block sent via $f_1$.
$P_2$=fraction of a block sent via $f_2$.
$f_1$=lower carrier frequency.
$f_2$=upper carrier frequency.

The improvement factor is therefore $$C=\frac{T}{T'}=\frac{Nn}{f_1}\;\frac{1}{\left(\frac{P_1}{f_1}+\frac{P_2}{f_2}\right)Nn}=\frac{1}{f_1\left(\frac{P_1}{f_1}+\frac{P_2}{f_2}\right)}$$

$$=\frac{1}{P_1+P_2\left(\frac{f_1}{f_2}\right)}$$

This result shows that the improvement factor depends only on the ratio of the carriers and the fraction of the total data sent via the lower and upper carriers. Merely lowering $f_1$ to reduce the ratio $f_1/f_2$ does not result in a net increase in data rate.

Figure 4:
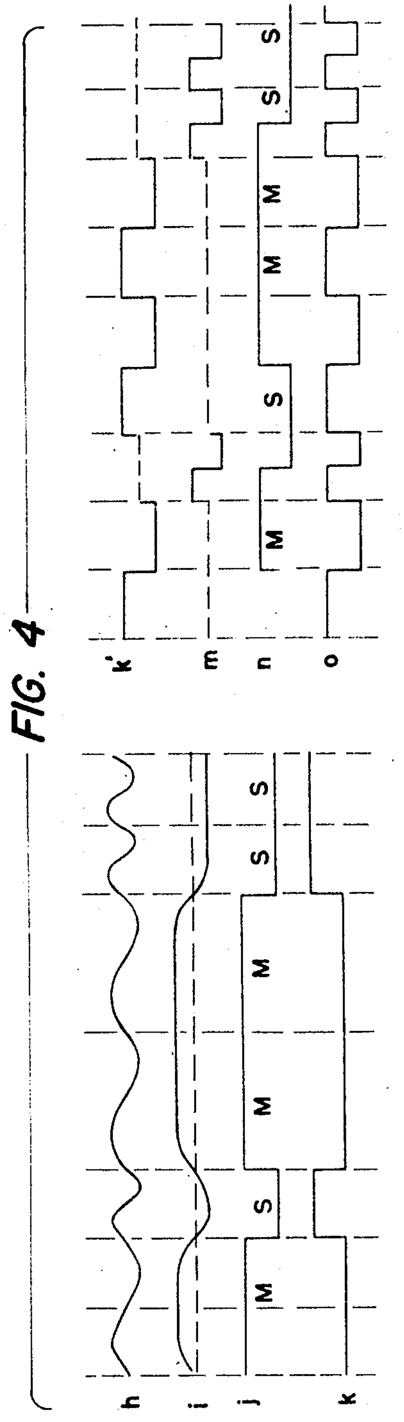
FIGURE 4 shows various waveforms helpful in understanding the binary receiver shown and described in FIGURE 3.

In operation, the waveform comprising one cycle of each of the marks and spaces, as shown in FIGURE 4*h*, is seen to have entered the bandpass filter 301 from the transmission lines. The detected waveform of information after demodulation in the limiter 303, zero crossing detector 305, and post detection filter 307 as is known in the art is seen at FIGURE 4*i*.

The decision threshold 309, which could be a squaring amplifier and limiter circuit, for example, returns the input information to its squarewave configuration, seen in FIGURE 4*j*, and the output thereof in FIGURE 3.

The output from the decision threshold 309 is then applied to the input of the timing recovery unit 313, AND gate 317, AND gate 319 via inverter 315, and sampler 311. The timing recovery unit 313 generates clock pulses at the $f_1$ and the $f_2$ rate in response to the mark and space pulses at the output of decision threshold 309. The $f_1$ clock indicative of a mark pulse is seen at FIGURE 4*k'*. The $f_2$ clock, indicative of space pulse information, is seen in FIGURE 4*m*. These clock frequencies are then applied to the input to AND gates 317 and 319, which have been enabled by the application of the waveform from the decision threshold 309, seen in FIGURE 4*j*, while AND gate 319 receives the inverted waveform in FIGURE 4*j* as FIGURE 4*k*. The output from AND gates 317 and 319, seen at FIGURE 4*o*, is the combined waveforms of FIGURE 4*k'* and *m*, now utilized as a clock source to the receiver buffer unit, which is similar to that in the transmitter in FIGURE 1.

The output from AND gates 317 and 319 is also applied to sampler unit 311. This unit may comprise a flip-flop circuit and associated AND gates for generation of the specific pulses as seen in FIGURE 4*n*. The output from sampler 311 is thus the reclocked data which is to be stored in the buffer store for subsequent utilization by a printout device such as a facsimile printer.

Figure 5:
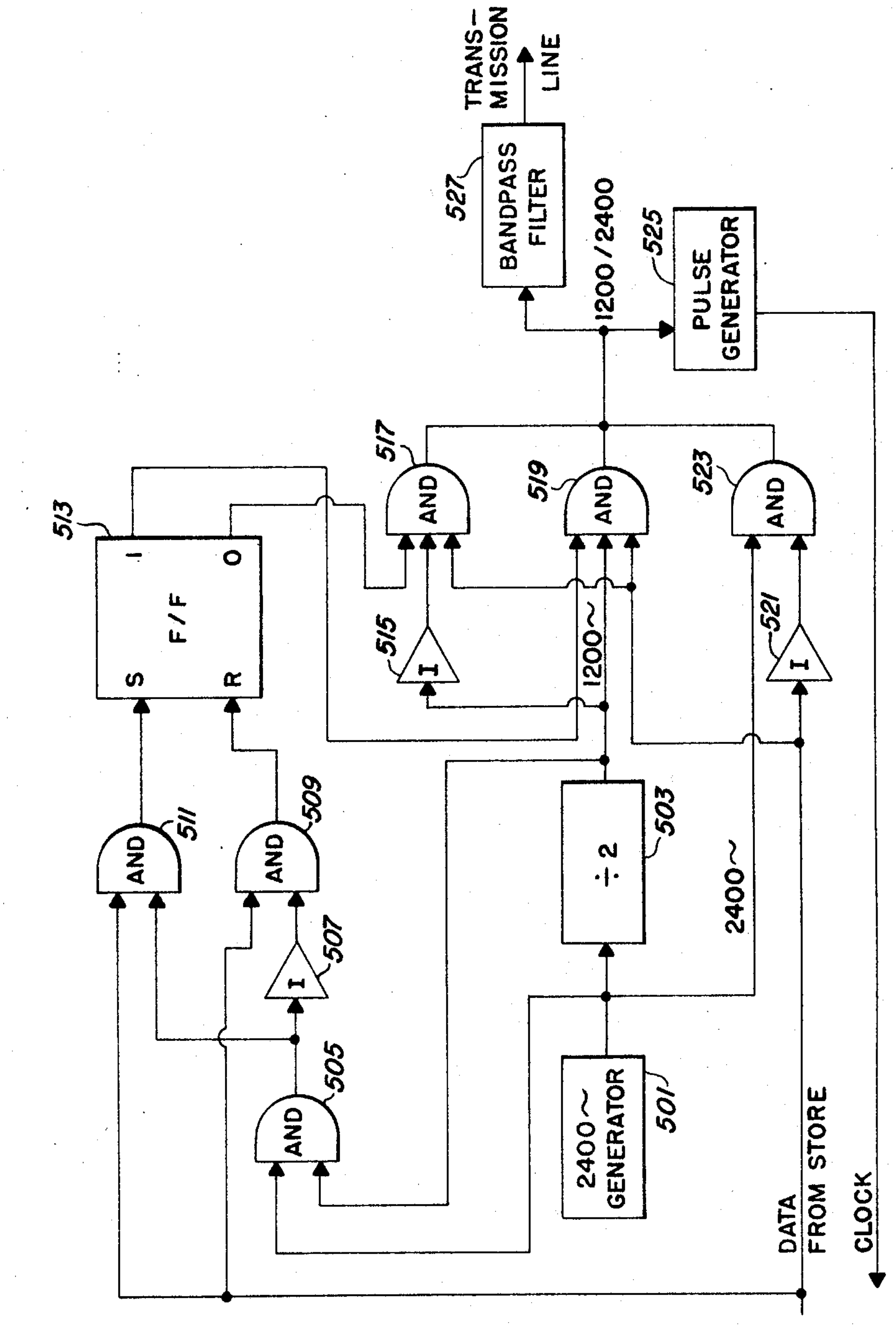
FIGURE 5 is a block diagram of a binary transmitter in accordance with a second embodiment of the present invention.

In accordance with the second aspect of the present invention, as seen in FIGURE 5, if the carrier frequencies are integrally related, a single carrier frequency source and associated logic may be employed to insure phase continuity at the data transitions.

The two carrier frequencies are generated by a 2400 c.p.s. oscillator 501 and a divider circuit 503, both of conventional design, which divides the oscillator frequency by two. These frequencies are selected for transmission by associated gates according to whether the input data is "mark" (positive in this case) or "space" (zero). The lower frequency, 1200 c.p.s. in this instance, is assigned to the mark state. In order to provide that the input data state lasts for exactly one cycle of carrier, regardless of frequency, in accordance with the principles of the present invention, a pulse is generated from each positive going transition of the combined carrier signal at pulse generator 525. These pulses are used to "clock" the data out of the buffer store, not shown. When a clock pulse occurs, the data line from the buffer storage unit will assume either the mark or space level according to the state of the data information. If the mark level occurs, the lower frequency (1200 c.p.s. in this case) is transmitted. As soon as a cycle has occurred, another clock pulse is generated. If the data is again "mark," another cycle of 1200 c.p.s. is transmitted. If the data is "space," the upper frequency (2400 c.p.s. in this case) is transmitted. As soon as a full cycle has occurred, another clock pulse is generated, and so on.

In operation of the embodiment shown in FIGURE 5, the input data from the buffer store appears as an input to gates 509, 511, 517, 519 and via inverter 521 to gate 523. The outputs from the 2400 c.p.s. generator 501 and its associated divider network 503 appears as inputs to AND gate 505. At the coincidence of the phases of the two frequencies, AND gate 505 is enabled and, depending upon the data state of the input information, effectively enables either gate 511 or gate 509 via inverter 507. If the incoming binary digit at one particular time interval is a mark, then AND gate 511 is enabled, setting flip-flop 513.

If the binary data happened to be a space then flip-flop 513 would be reset. The set or "1" output from flip-flop 513 enables AND gate 519. With the other two inputs to the gate 519 being the data and the 1200 c.p.s. signal, one cycle at the 1200 c.p.s. rate would be passed out to the bandpass filter 527. In a similar manner, the reset output from flip-flop 513 enables gate 517, which allows the inverse of the 1200 c.p.s. signal to appear on the output of AND gate 517. The other output from 2400 c.p.s. generator 501 is an input to AND gate 523. The data from the buffer store is inverted in phase by inverter 521 and appears as the other input to AND gate 523. Thus, at the particular phase indication, the output from the gates 517, 519 and 523 are the proper frequencies, i.e., 1200 or 2400 c.p.s., which allows the pulse generator 525 to generate the clock pulse in a manner to be described. Bandpass filter 527 is provided in a similar manner as was bandpass filter 113 in FIGURE 1 to filter out the unwanted harmonics of the square wave signals generated internally in the circuitry.

In the above example, the transition from the lower to higher frequency is always in-phase, but the transition from the higher to the lower frequency may be in-phase or 180° out-of-phase, depending upon how many cycles (bauds) have occurred. The solution is to make both phases of the lower frequency available and to provide logic to select the proper phase. Consider, for example, a transition from 2400 to 1200 c.p.s. Since the clock pulse is always generated at the output of pulse generator 525 from the positive going transition of the transmitted signal, the 2400 c.p.s. carrier is always positive (or "1") immediately thereafter. The 1200 c.p.s. carrier may be either "1" or "0" at this time and the data may be either "1" or "0" (i.e., a mark or space) at this time. If the data is a space then the 2400 c.p.s. signal is to continue; there is no transition and therefore no phase problem.

If the data is a mark, then a transition is necessary, as the 2400 c.p.s. carrier is associated with space data. If the 2400 c.p.s. and 1200 c.p.s. signals are not of the same phase at this time, then the inverse of the 1200 c.p.s. frequency is selected as indicated by the logic table shown below. If the two signals are in phase then the normal 1200 c.p.s. signal is selected. Phase continuity is thus assured regardless of when transitions occur.

LOGIC TABLE FOR TRANSMITTER OF FIG. 5
[Last bit-space]

| Present data bit | M | | S | |
|---|---|---|---|---|
| 2,400 carrier | 1 | | 1 | |
| 1,200 carrier | 0 | 1 | 0 | 1 |
| AND gate 505 | F | T | F | T |
| AND gate 509 | T | F | T | F |
| AND gate 511 | F | T | F | T |
| F/F | F | T | F/T | F/T |
| AND gate 517 | T | F | F | F |
| AND gate 519 | F | T | F | F |
| AND gate 523 | F | F | T | T |
| Output | [1] 1,200 | [2] 1,200 | [2] 2,400 | [2] 2,400 |

[1] Inverted.
[2] Normal.

Figures 6, 7:
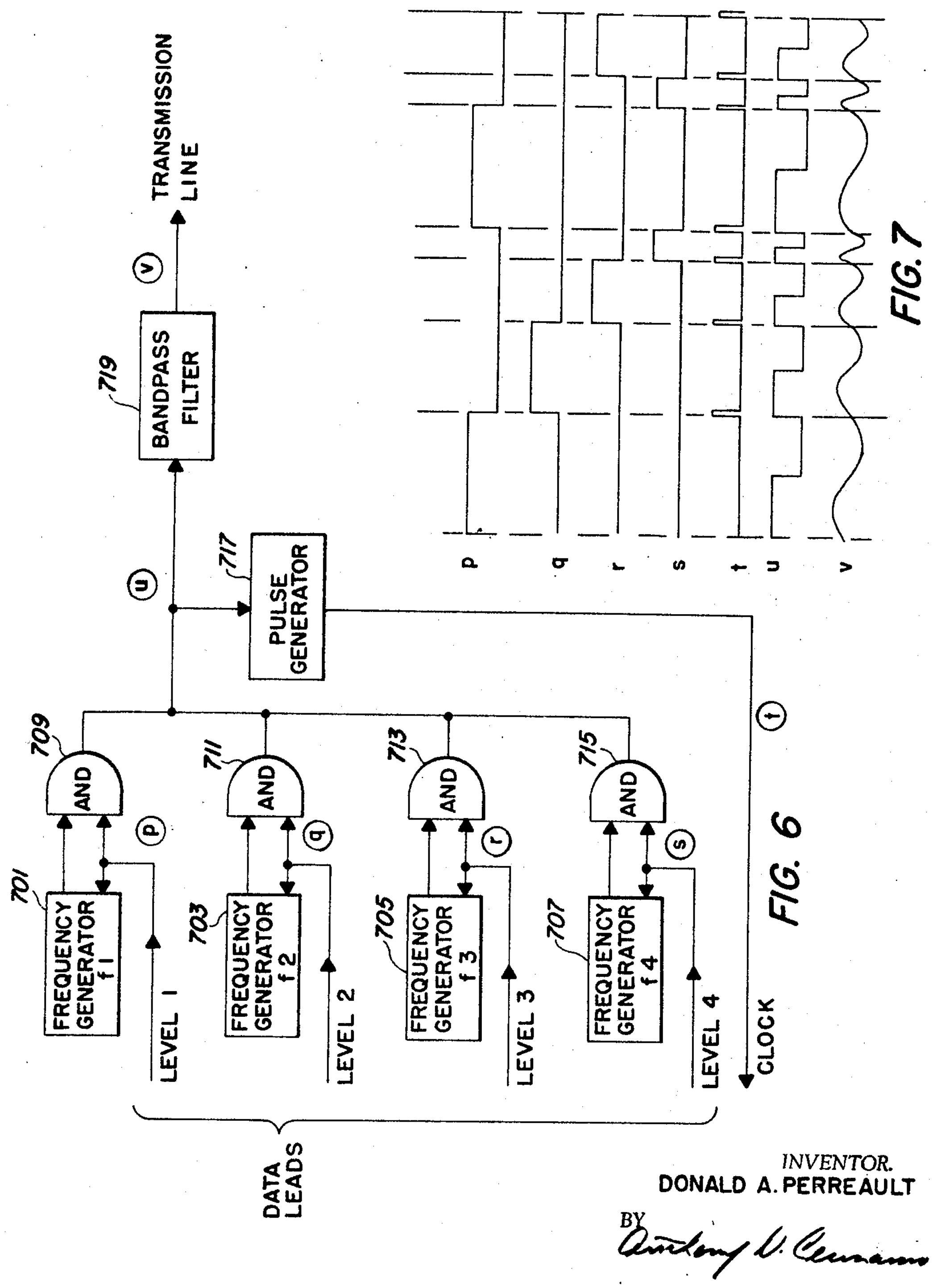
FIGURE 6 is a block diagram of a four-level transmitter in accordance with the third embodiment of the present invention.
FIGURE 7 shows various waveforms helpful in understanding the transmitter shown and described in FIGURE 6.

Referring now to FIGURE 6, there is shown a quaternary transmitter in accordance with a third aspect of the present invention. In a frequency shift keyed signal utilizing more than two frequencies, separate carrier sources must ordinarily be utilized unless a very fortuitous spacing of carrier frequencies is available. FIGURE 6 discloses frequency generators 701, 703, 705, and 707, which generate frequencies $f_1$ through $f_4$ respectively. With each incoming level representative of information data, AND gates 709, 711, 713 and 715 are selectively enabled to allow the one cycle of the specific frequency to pass to the bandpass filter 719 and the pulse generator 717. The output from the pulse generator 717 is used to clock the information from a buffer store, not shown, in which the data information is intermediately stored upon output from the information source before being fed to the frequency generators and associated AND gates.

With reference to FIGURE 7, the quaternary data inputs to AND gates 709, 711, 713 and 715 can be seen as curves *p*, *q*, *r*, and *s*, respectively. The outputs from the AND gates is shown in FIGURE 7*u*, showing the one cycle of each frequency enabled by the input data levels. The output from pulse generator 717 is shown as curve *t*, which is used to clock the data from the buffer store to the frequency generators. Bandpass filter 719 is provided as were the bandpass filters in FIGURES 1 and 5, the output of which is curve *v*, to filter the unwanted harmonic frequencies occurring as a result of the square wave signals shown in curve *u* in FIGURE 7.

The speed improvement of the above embodiment depends upon the relative amount of time each level is transmitted. The most improvement occurs when the highest frequency is transmitted more often. The improvement factor is given by the expression $$C=\frac{1}{P_1+P_2\left(\frac{f_1}{f_2}\right)+P_3\left(\frac{f_1}{f_3}\right)+P_4\left(\frac{f_1}{f_4}\right)}$$

where, $P_1$=fraction of block sent via $f_1$.
$P_2$=fraction of block sent via $f_2$.
$P_3$=fraction of block sent via $f_3$.
$P_4$=fraction of block sent via $f_4$.

where $f_1, f_2, f_3, f_4$=carrier frequencies.

For example, if $P_1=P_2=P_3=P_4=1/4$, as for well encoded data, and $f_1=1200$, $f_2=1600$, $f_3=2000$, $f_4=2400$, as for a possible voice frequency data system, then $C=1.4$, indicating an average baud rate of 1680 instead of 1200, or an average bit rate of 3360, instead of 2400, if the data is Nyquist encoded.

The disclosed invention is particularly adaptable to black and white facsimile transmission. The invention could be used to transmit unencoded black and white facsimile images at an average rate higher than via an equivalent conventional frequency shift data system. One method is to utilize a constant velocity horizontal scan and a stepped vertical scan. The electrical signal produced by the horizontal scan is quantized into binary digits and loaded into a binary data buffer store. The transmitter extracts the data from the buffer store and transmits it, according to the invention as was hereinbefore described. When the buffer store is empty a control signal causes the scan to step vertically to the next line and the process continues. Various ways of optimizing the use of storage under such conditions are available. At the printer, the receiver loads a bit store at a variable rate. When a complete line of data is available, control signals unload the data from the buffer store to the printer and advance it to the next line.

Another method of transmitting black and white facsimile information is to utilize a scanning beam at both scanner and printer which can be positioned in discrete steps both horizontally and vertically. The beam is moved horizontally at two different rates, depending on whether black or white is being scanned, i.e., depending on which carrier frequency is being transmitted. In effect, therefore, the signal is quantized in a horizontal direction just as when storage is used. At the receiver-printer the process is reversed so that the printer scan is synchronized to the scanner.

The invention is also adaptable to gray scale facsimile transmission. That is, if the modulator output frequency is a linear function of the input signal amplitude, scanning beam position can be controlled according to the number of crossovers of the output signal or the beam velocity can be controlled according to the output of a wide band discriminator used to detect the instantaneous frequency of the output signal. At the receiver-printer the process is reversed so that the printer scan is positioned according to the number of crossovers received, if no carrier shift occurs in transmission, or the scan velocity is controlled by the receiver discriminator output.

In the foregoing, there has been disclosed methods and apparatus for optimizing the transmission of binary signals in a frequency shift keyed system. While the different embodiments have been described with respect to a facsimile scanning system, such circuitry is exemplary only as other circuits and apparatus could be utilized in a frequency shift keyed system to perform the disclosed transmit and receive functions. In addition, certain binary transmission rates and frequency modulated signals are disclosed, but it is apparent that other rates and frequencies could be used within the scope of the invention.

Thus, while the present invention, as to its objects and advantages, as described herein, has been set forth in specific embodiments thereof, they are to be understood as illustrative only and not limiting.

What is claimed is:

1. A method of transmitting signals representative of information from a data source comprising:

generating a predetermined frequency signal for each level of information emanating from said data source; and transmitting one cycle of each frequency signal in response to the respective level of information from said data source.

2. The method as set forth in claim 1, wherein said step of transmitting includes:

gating each of said frequency signals in response to the respective level of information from said data source; and clocking said information data source at the rate which the frequency signals are gated whereby only one cycle of each frequency is transmitted.

3. A data transmitter comprising:

information source means for generating data signals of at least two information levels;

frequency generator means for generating a predetermined frequency signal for each information level of said data signals;

gating means coupled to said frequency generating means for transmitting one cycle of the selected frequency signals in response to the respective levels of said data signals;

pulse generating means coupled to said gating means for generating clock pulses in response to each transmitted frequency signal and means coupling said pulse generating means to said information source to advance the data signals from said data source thereby allowing only said one cycle of said selected frequency signal to be transmitted.

4. A device as set forth in claim 3 further including:

buffer storage means coupled to said information source means for storing said data signals;

said buffer storage means being coupled to said pulse generating means and said gating means for emitting said stored data signals to said gating means in response to the clock pulse rate.

5. A device as set forth in claim 4 further including:

bandpass filter means for filtering out the undesirable harmonic frequencies in said transmitted frequency signals.

6. In a frequency shift-key transmitter, the combination comprising:

a plurality of frequency generating means for generating a plurality of signals of predetermined frequencies;

a source of data signals;

gating means coupled to said plurality of frequency generating means operable to transmit one cycle of selected ones of said frequency signals in response to said data signals;

pulse generating means coupled to said gating means for generating clock pulses in response to each cycle of the selected ones of said frequency signals; and means coupling said pulse generating means to said data signal source to advance data signals in a time relationship with said clock pulses, whereby only said one cycle of each of said frequency signals is transmitted.

7. In a data transmission system, a transmitter comprising:

a plurality of waveform generators, each having a different frequency of oscillation;

a source of data signals;

gating means coupled to said waveform generators operably controlled by said data signals to transmit selected ones of said waveforms; and means coupled to said gating means for transmitting only one cycle of each of the selected ones of said waveforms.

8. A method of transmitting signals representative of information from a data source comprising:

generating a predetermined frequency signal for one level of information emanating from said data source;

dividing said predetermined frequency signal into a sub-multiple frequency signal for another level of information emanating from said data source;

transmitting one cycle of said frequency signal in response to the respective level of information from said data source;

further transmitting one cycle of one phase of said sub-multiple frequency signal in response to the respective level of information from said data source when the transition from the higher to sub-multiple frequency signal is in phase, and further transmitting one cycle of the opposite phase of said sub-multiple frequency signal in response to the respective level of information from said data source when the transition from the higher to sub-multiple frequency signal is 180° out of phase.

9. A data transmitter comprising:

information source means for generating data signals of at least two information levels;

frequency generating means for generating a signal of predetermined frequency;

divider means responsive to said frequency generating means for generating at least one signal of a sub-multiple of said predetermined frequency;

first gating means coupled to said frequency generating means and said divider means, said first gating means being enabled at the coincidence of the phases of the predetermined frequency and the sub-multiple frequency;

second gating means coupled to said first gating means and said information source means for emitting a first signal when said data signal is at a first information level and for emitting a second signal when said data signal is at a second information level;

switching means coupled to said second gating means and operable to switch to a first or second state signal in response to said first and second signals, respectively;

third gating means coupled to said first state output of said switching means for transmitting one cycle of said sub-multiple frequency in response to the coincidence of said first state signal, said sub-multiple frequency and said data signal level representative thereof;

fourth gating means coupled to said second state output of said twitching means for transmitting one cycle of the opposite phase of said sub-multiple frequency in response to the coincidence of said second state signal, said sub-multiple frequency and said other data signal level representative thereof;

fifth gating means for transmitting one cycle of said predetermined frequency in response to the coincidence of said signal of predetermined frequency and the opposite phase of said data signal;

pulse generating means coupled to said third, fourth, and fifth gating means for generating clock pulses in response to each transmitted frequency signal, and means coupling said pulse generating means to said information source to advance the said pulses utilized to step the data signals from said information source thereby allowing only said one cycle of each of said frequencies to be transmitted.

References Cited

UNITED STATES PATENTS

| | | | |
|---|---|---|---|
| 3,102,238 | 8/1963 | Bosen | 328—27 |
| 3,142,723 | 7/1964 | Fleming | 325—30 X |
| 3,165,583 | 1/1965 | Kretzmer et al. | 178—66 |
| 3,190,958 | 6/1965 | Bullwinkle et al. | 325—30 X |

ROBERT L. GRIFFIN, *Primary Examiner.*

WILLIAM S. FROMMER, *Assistant Examiner.*

U.S. Cl. X.R.

325—163, 320; 328—27